(12) United States Patent
Bolton

(10) Patent No.: US 7,613,566 B1
(45) Date of Patent: Nov. 3, 2009

(54) NAVIGATION DEVICE WITH IMPROVED ZOOM FUNCTIONS

(75) Inventor: Kenneth A. Bolton, Olathe, KS (US)

(73) Assignee: Garmin Ltd. (KY)

( * ) Notice: Subject to any disclaimer, the term of this patent is extended or adjusted under 35 U.S.C. 154(b) by 547 days.

(21) Appl. No.: 11/225,505

(22) Filed: Sep. 13, 2005

(51) Int. Cl.
*H04B 7/185* (2006.01)
*G06T 11/60* (2006.01)

(52) U.S. Cl. ............... 701/212; 701/208; 701/213; 345/428; 345/156; 340/990; 340/995.14

(58) Field of Classification Search ............... 701/200, 701/211, 212; 715/782; 434/30
See application file for complete search history.

(56) References Cited

U.S. PATENT DOCUMENTS

| | | | | |
|---|---|---|---|---|
| 6,014,606 A | * | 1/2000 | Tu | 701/200 |
| 6,334,090 B1 | * | 12/2001 | Fujii | 701/213 |
| 6,346,942 B1 | * | 2/2002 | Endo et al. | 345/427 |
| 6,452,544 B1 | * | 9/2002 | Hakala et al. | 342/357.13 |
| 6,882,853 B2 | * | 4/2005 | Meyers | 455/457 |
| 6,889,138 B1 | | 5/2005 | Krull et al. | 701/211 |
| 6,892,135 B1 | | 5/2005 | Krull et al. | 701/211 |
| 2001/0030667 A1 | * | 10/2001 | Kelts | 345/854 |
| 2004/0204849 A1 | * | 10/2004 | Shipley et al. | 701/212 |
| 2006/0074553 A1 | * | 4/2006 | Foo et al. | 701/212 |

FOREIGN PATENT DOCUMENTS

GB          2412281 A     *    9/2005

* cited by examiner

*Primary Examiner*—Thomas G Black
*Assistant Examiner*—Lin B Olsen
(74) *Attorney, Agent, or Firm*—Samuel M. Korte

(57) ABSTRACT

A navigation device with improved zoom functions is disclosed. The navigation device is generally operable to display a map with varying magnifications and perspectives to enable a user to increase or decrease magnification and perspective without creating a substantial and immediate change in perspective. Such a configuration reduces user confusion due to the elimination of substantial changes in perspective during magnification and demagnification.

31 Claims, 2 Drawing Sheets

NAVIGATION DEVICE WITH IMPROVED ZOOM FUNCTIONS

BACKGROUND OF THE INVENTION

1. Field of the Invention

The present invention relates to navigation devices. More particularly, the invention relates to a navigation device with improved zoom functions that enable a map to be displayed with varying magnifications and perspectives.

2. Description of the Related Art

Navigation devices are becoming increasingly popular due to their many beneficial features. For example, navigation devices commonly utilize the Global Positioning System (GPS) to calculate an accurate current geographic location based on received GPS signals. Due to this ability, navigation devices are commonly utilized by users in innumerable situations, including walking, exercising, biking, driving, boating, flying, etc.

Many navigation devices also allow users to zoom in or out on a particular displayed location. For example, navigation devices often include one or more inputs that may be functioned by a user to increase or decrease magnification of a displayed map. Further, such zoom functionality generally includes displaying an overhead view when magnification is limited, i.e. when zoomed out, and displaying a perspective view when magnification is great, i.e. when zoomed in.

Unfortunately, navigation devices often immediately toggle between limited perspective views and substantial perspective views in response to user magnification inputs, thereby confusing users and hindering navigation. For example, various points of reference, waypoints, or other navigation aides displayed on an overhead view may be lost or substantially repositioned on the display when immediately switching from the overhead view to a perspective view. Thus, users often elect to forgo otherwise beneficial zoom functionality due to the immediate change in perspective and associated confusion caused by zoom functions.

SUMMARY OF THE INVENTION

The present invention solves the above-described problems and provides a distinct advance in the art of navigation devices. More particularly, the invention provides a navigation device with improved zoom functions that enable a map to be displayed with varying magnifications and perspectives. Such functionality enables a user to increase or decrease magnification and perspective without creating an immediate and substantial change in perspective.

In one embodiment, the navigation device generally includes a processor operable to acquire data corresponding to a map and a display coupled with the processor and operable to display the map. The processor and display are further operable to display the map with a first magnification and a first perspective, and in response to a magnification request, display the map with a second magnification and a second perspective, and a third magnification and a third perspective.

In another embodiment, the navigation device generally includes: a processor operable to receive at least one magnification request and acquire data corresponding to a map including a current geographic location of the device; a location determining component coupled with the processor and operable to facilitate determination of the current geographic location of the device; a user interface operable to receive the at least one magnification request from a user; and a display coupled with the processor operable to display the map. The processor and the display are further operable to display the map with a first magnification and a first perspective, display the map with a second magnification and a second perspective in response to a first magnification request, and display the map with a third magnification and a third perspective in response to a second magnification request.

In another embodiment, the invention provides a method of displaying a map. The method generally includes: displaying the map utilizing a first magnification and a first perspective; receiving a magnification request; and, in response to the magnification request, displaying the map with a second magnification and a second perspective and displaying the map with a third magnification and a third perspective.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
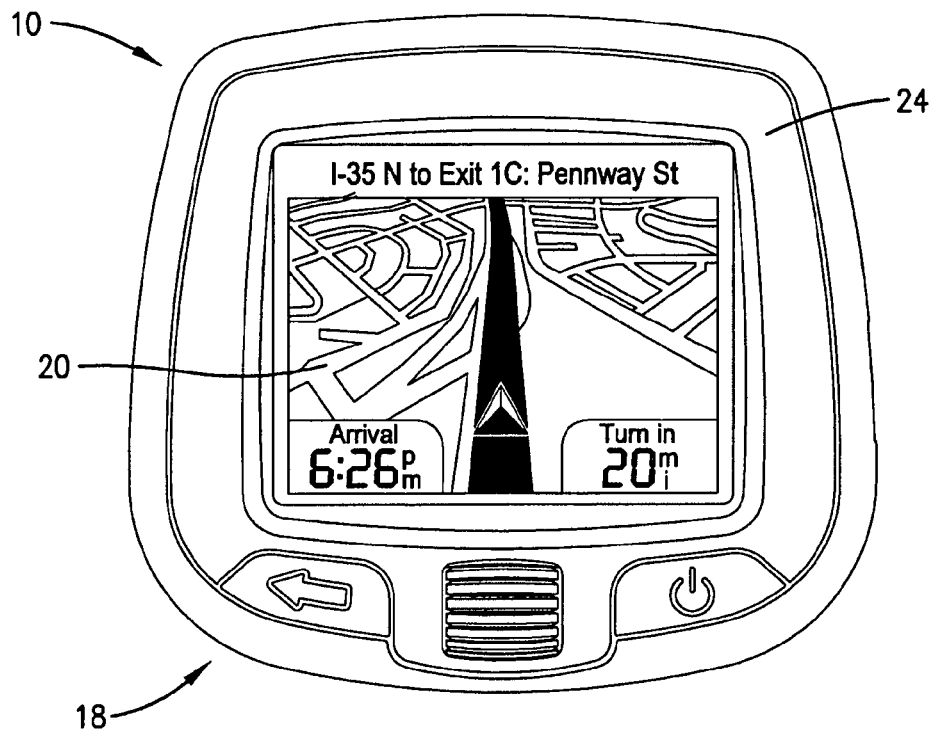
FIG. 1 is a front view of a navigation device configured in accordance with various preferred embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
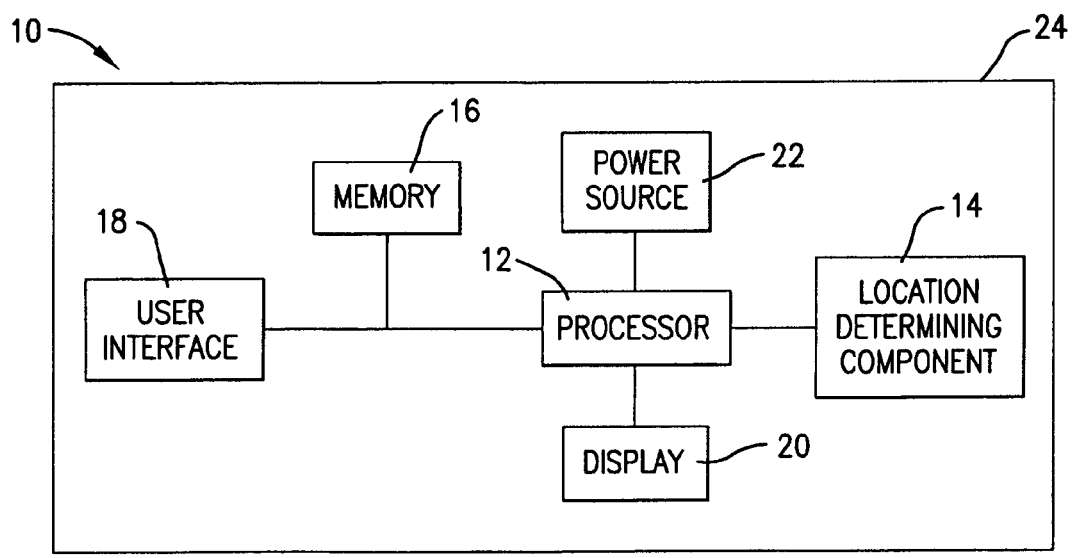
FIG. 2 is a block diagram of the navigation device of FIG. 1.

As shown in FIGS. 1-2, the present invention is preferably implemented utilizing a navigation device 10. The device 10 may be any device operable to provide navigation information to a user. Thus, the device 10 may include computers, televisions, radios, portable computing devices such as laptops or personal data assistants (PDAs), cellular telephones, etc. Preferably, the device 10 is an automobile-mounted navigation device manufactured by GARMIN INTERNATIONAL INC. of Olathe, Kans. However, the device 10 may be any device configured as described herein or otherwise operable to perform the functions described below.

The device 10 preferably includes a processor 12, a location determining component 14 coupled with the processor 12 to facilitate determination of a current geographic location, a memory 16 coupled with the processor 12 and operable to store navigation information, a user interface 18 coupled with the processor 12 and operable to communicate with a user, a display 20 and power source 22 each coupled with the processor 12, and a housing 24 for housing the various components of the device 10.

The processor 12 is preferably coupled with the user interface 18, location determining component 14, memory 16, and display 20, through wired or wireless connections, such as a data bus, to enable information to be exchanged between the various elements. Further, the processor 12 is preferably operable to control the various functions of the device 10 according to a computer program or other instructions associated with the memory 16 or with various processor logic and structure. The processor 12 may comprise various computing elements, such as integrated circuits, microcontrollers, microprocessors, programmable logic devices, etc, alone or in combination to perform the operations described herein.

As described below in more detail, the processor 12 may determine a geographic location of the device 10 by receiving the geographic location from the location determining component 14. Alternatively, the processor 12 may independently determine geographic location based on information and/or data provided by the location determining component 14 or other device 10 elements.

The location determining component 14 is coupled with the processor 12 to facilitate determination of geographic locations including a current location of the device 10. The location determining component 14 is not required in all embodiments as the processor 12 may retrieve geographic information from other sources such as the user interface 18 or through internal data stored within the memory 16. However, the location determining component 14 is preferably coupled with the processor 12 to enable rapid and accurate geographic location determination.

The location determining component 14 is preferably a global positioning system (GPS) receiver, and is adapted to provide, in a substantially conventional manner, geographic location information for the device 10. The location determining component 14 may be, for example, a GPS receiver much like those disclosed in U.S. Pat. No. 6,434,485, which is incorporated herein by specific reference. However, the location determining component 14 may receive cellular or other positioning signals utilizing various methods to facilitate determination of geographic locations without being limited to GPS.

The location determining component 14 may also include various processing and memory elements to determine the geographic location of the device 10 itself or it may provide information to the processor 12 to enable the processor 12 to specifically determine the geographic location of the device 10. Thus, the location determining component 14 need not itself calculate the current geographic location of the device 10 based upon received signals. The location determining component 14 also may include an antenna for receiving signals, such as a GPS patch antenna or helical antenna.

Further, the location determining component 14 may be integral with the processor 12 and/or memory 16 such that the location determining component 14 may be operable to specifically perform the various functions described herein, including steps 100-110. Thus, the processor 12 and location determining component 14 need not be separate or otherwise discrete elements.

The memory 16 is coupled with the processor 12 and/or other device 10 elements and is operable to store various data utilized by the processor 12 and/or other elements. The memory 16 may include removable and non-removable memory elements such as RAM, ROM, flash, magnetic, optical, and/or other conventional memory elements. Further, the memory 16 may comprise a portion of the user interface 18 to enable the user to provide information to the device 10 via the memory 16, such as by inserting flash or other removable memory into the device 10 to provide information and instruction to the device 10. Also, the memory 16 may be integral with the processor 12, such as in embodiments where the memory 16 comprises internal cache memory or other memory included within the processor 12.

The memory 16 may store various data associated with operation of the device 10, such as a computer program or other data for instructing the processor 12 and other device 10 elements to perform the steps described below. Further, the memory 16 may store various cartographic data corresponding to map data and map elements, such as thoroughfares, terrain, alert locations, points of interest, and other general navigation data to facilitate the various navigation functions provided by the device 10 including display, map generation, alert notification, and route calculation. Additionally, the memory 16 may store destination addresses and previously calculated or otherwise acquired routes to various destination addresses for later retrieval by the processor 12.

Further, the various data stored within the memory 16 may be associated within a database to facilitate processor 12 retrieval of information. For example, the database may be configured to enable the processor 12 to retrieve map data and related information based upon a current geographic location of the device 10, etc.

The user interface 18 enables users, third parties, or other devices to share information with the device 10. The user interface 18 is generally associated with the housing 24, such as by physical connection through wires, etc, or wirelessly utilizing conventional wireless protocols. Thus, the user interface 18 need not be physically coupled with the housing 24.

The user interface 18 may comprise one or more functionable inputs such as buttons, switches, scroll wheels, etc, a touch screen associated with the display 20, voice recognition elements, pointing devices such as mice, touchpads, trackballs, styluses, combinations thereof, etc. Further, the user interface 18 may comprise wired or wireless data transfer elements such as removable memory including the memory 16, network connections, data transceivers, etc, to enable the user and other devices or parties to remotely interface with the device 10.

Further, the user interface 18 is preferably operable to provide various information to the user utilizing the display 20 or other visual or audio elements such as a speaker. Thus, the user interface 18 enables the user and device 10 to exchange information relating to the device 10, including configuration, preferences, route information, points of interests, alerts and alert notification, navigation information, waypoints, a destination address, etc.

The display 20 is coupled with the processor 12 and/or other device 10 elements and is operable to display various information corresponding to the device 10, such as maps, routes and map elements, as is described below. The display 20 may comprise conventional black and white, monochrome, or color display elements including CRT and LCD devices. Preferably, the display 20 is of sufficient size to enable the user to easily view the display 20 to receive presented information while in transit. Further, as described above, the display 20 may comprise a portion of the user interface 18, such as in embodiments where the display 20 is a touch-screen display to enable the user to interact with the display 20 by touching or pointing at display areas to provide information to the device 10.

The power source 22 is associated with the housing 24 to provide electrical power to various device 10 elements. For example, the power source 22 is preferably directly or indirectly coupled with the user interface 18, location determining component 14, processor 12, memory 16, and/or display 20. The power source 22 may comprise conventional power supply elements, such as batteries, battery packs, etc. The power source 22 may also comprise power conduits, connectors, and receptacles operable to receive batteries, battery connectors, or power cables. For example, the power source 22 may include both a battery to enable portable operation and a power input for receiving power from an external source such an automobile.

The housing 24 may be handheld or otherwise portable to facilitate transport of the device 10 between locations. Preferably, the housing 24 is suitable for mounting or coupling with an automobile to enable the device 10 to be utilized while in transit. Thus, the housing 24 may be configured for mounting within or on an automobile in a generally conventional manner and may comprise generally conventional and durable materials, such as ABS, plastics, metals, etc, to protect the enclosed and associated elements.

Figure 4:
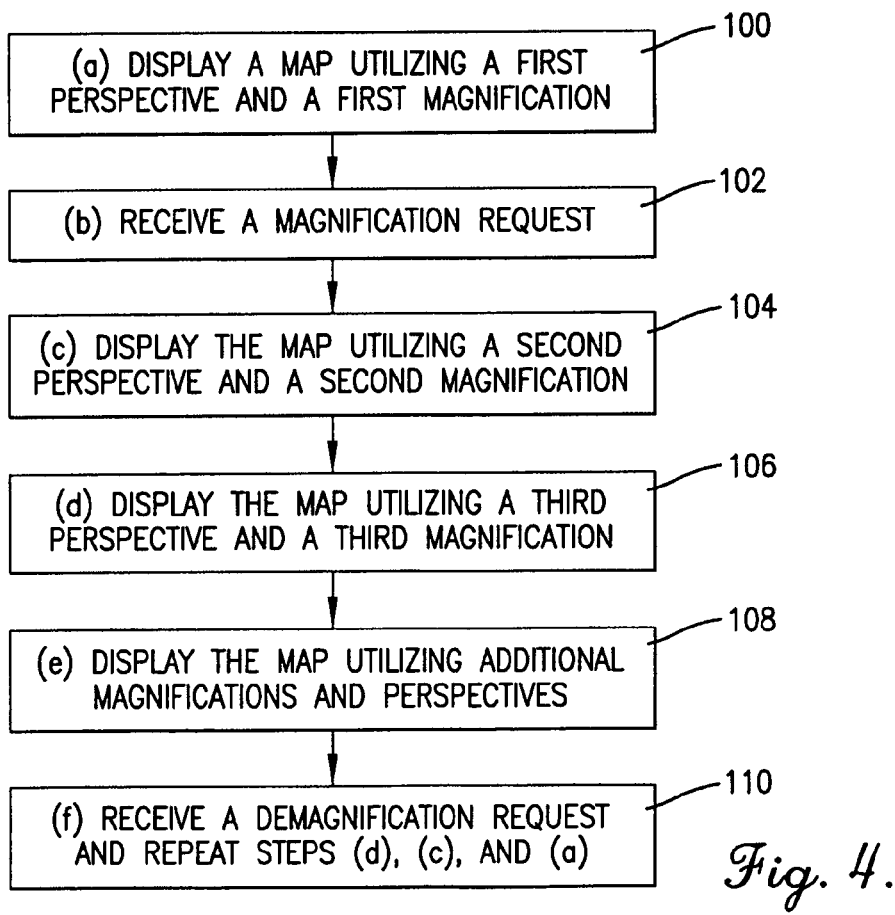
FIG. 4 is a flow chart showing some of the steps that may be performed by the navigation device of FIGS. 1-3.

Steps 100-110 shown in FIG. 4 generally illustrate the preferred operation of the device 10 which generally includes the steps of: (a) displaying a map utilizing a first perspective and a first magnification, referenced at step 100; (b) receiving a magnification request, referenced at step 102; (c) displaying the map utilizing a second perspective and a second magnification, referenced at step 104; (d) displaying the map utilizing a third perspective and a third magnification, referenced at step 106; (e) displaying the map utilizing additional perspectives and magnifications, referenced at step 108; and (f) receiving a demagnification request and repeating at least a portion of steps (d), (c), and (a), referenced at step 110.

The method described herein may be utilized manually by a user or in combination with any device such that utilization of the device 10 is not necessarily required. Further, steps 100-110 may be performed in any order and are not limited to the specific order described herein. Further, steps 100-110 may be performed simultaneously or concurrently such that the steps are not necessarily sequential.

In step 100, the device 10 displays a map utilizing a first perspective and a first magnification. The map may be acquired for display on the display 20 utilizing various methods, including utilizing the processor 12 to acquire the map, or data corresponding to the map, retrieving the map or corresponding data from memory 16 or the user interface 18, and/or utilizing conventional navigation and mapping methods known in the art, such as those described in U.S. Pat. No. 6,856,899, which is incorporated herein by specific reference. As described above, the processor 12 is coupled with the display 20 to control presented images in a generally conventional manner.

The acquired map preferably includes the current geographic location of the device 10. As described above, the current geographic location of the device 10 may be determined through various methods, including utilizing the processor 12 and/or location determining component 14 to calculate the location based on received signals. However, the current geographic location may be determined through other methods, such as by retrieving the current location from the memory 16 or the user interface 18.

The map is displayed in step 100 utilizing the first perspective and the first magnification. Perspective, as utilized herein, generally refers to the appearance of objects in depth on the display 20. For instance, a displayed image with zero perspective, such as an overhead image, would present near and far objects with generally the same size such that a user perceives no depth. In contrast, a displayed image with substantial perspective, such as a perspective image from directly behind a user, would present near and far objects with different sizes or shapes, such that near objects appear larger than far objects to enable depth to be perceived by the user.

Magnification, as utilized herein, generally refers to the apparent presented size of images on the display 20. For instance, a displayed image with zero or little magnification would show the image from a first distance while the displayed image with substantial magnification would show the image from a second distance, closer or nearer than the first distance, thereby increasing the viewable size of objects displayed within the image.

Figure 3:
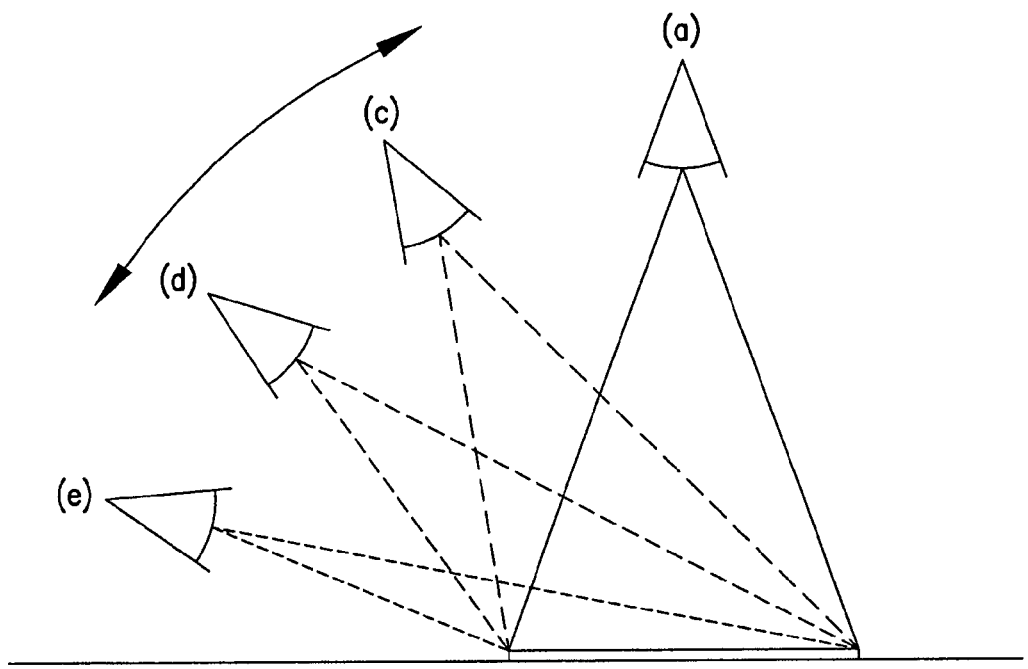
FIG. 3 is a schematic view showing various perspectives operable to be utilized by the navigation device of FIGS. 1-2.

As shown in FIG. 3, the first perspective and first magnification utilized to display the map in step 100 are preferably each limited or otherwise insubstantial, such that the first perspective presents a generally overhead view of the displayed map and the first magnification presents the map at a distance, i.e. zoomed-out.

However, as will be appreciated by those skilled in the art, the first perspective and first magnification need not correspond to the most limited perspective and most limited magnification operable to be provided by the device 10. That is, the first perspective and first magnification may each correspond to some value greater than the minimum perspective and minimum magnification operable to be provided by the device. For example, step 100 may correspond to intermediate perspective and magnification values achieved with or without user input such as a magnification request. For instance, the first perspective and first magnification may be utilized to display the map after the user has requested magnification, as discussed below in step 102, such that the displayed map of step 100 includes increased magnification and/or perspective in contrast to a previously displayed map. Thus, step 100 may be performed concurrently with or subsequent to step 102.

In step 102, the magnification request is received. Preferably, the processor 12, through the user interface 18 including the display 20 and/or memory 16, receives the magnification request. For example, the user may provide the magnification request by functioning an input, such as a button or switch, included with the user interface 20, by providing data through the user interface 12 utilizing the memory 16 and/or additional devices, by touching or pointing at the display 20, by issuing a voice command, etc.

The magnification request may comprise a single request or the magnification request may comprise a plurality of magnification requests, such as a request by the user to increase magnification by some multiple. For example, the user may function the user interface 18 more than once to repeatedly increase magnification, as is described below in more detail.

In various embodiments, the device 10 may automatically provide the magnification request such that user interaction or reception of the magnification request is not necessarily required. For example, the processor 12 may automatically generate the magnification request in response to a navigation event. The navigation event may correspond to a particular geographic location or area such that the processor 12 automatically generates the magnification request when the device 10 approaches or enters the location or area. Similarly, the navigation event may correspond to stored locations or areas, approaching a turn, approaching a point of interest, approaching an intersection, approaching a route, changes in speed or acceleration, changes in traveled thoroughfares, or any other situation where increased magnification may facilitate navigation. Additionally, the magnification request may be provided by a combination of user input through the user interface 14 and automatic generation by the processor 12.

In step 104, the map is displayed utilizing the second perspective and the second magnification. As shown in FIG. 3, the second perspective is greater than the first perspective and the second magnification is greater than the first magnification such that the progression from step 100 to step 104 causes an increase in perspective and an increase in magnification. For example, the displayed map of step 104 may generally comprise a zoomed and rotated display of the map presented in step 100.

Preferably, step 104 is performed in response to the received magnification request of step 102, such that when a user requests magnification the displayed map increases magnification and perspective accordingly. However, step 104 may be performed automatically or otherwise not specifically in response to the magnification request of step 102.

Additionally, the increase in magnification and perspective is preferably not so substantial as to disorient or confuse the user by drastically switching perspective and magnification. For instance, the intended effect of steps 100 and 104 is to gradually increase magnification and perspective such that the user may continue to identify objects presented on the display of step 104 without confusion. Thus, the second perspective and second magnification preferably increase perspective and magnification only to the extent that currently traveled routes, currently traveled thoroughfares, proximate connecting thoroughfares, and other proximate map elements may remain aligned or positioned in a similar manner to that displayed in the map of step 100.

In step 106, the map is displayed utilizing the third perspective and the third magnification. As shown in FIG. 3, the third perspective is greater than the second perspective and the third magnification is greater than the second magnification such that the progression from step 104 to step 106 causes an increase in perspective and an increase in magnification. For example, the displayed map of step 106 may generally comprise a zoomed and rotated display of the map presented in step 104.

Thus, step 106 is generally similar to step 104 with the exception that the third perspective and third magnification are greater than the second perspective and second magnification. Also in a generally similar manner to step 104, the increase in magnification and perspective provided by the third perspective and the third magnification is preferably gradual, as described above, to prevent user confusion in progressing from steps 104 to 106.

However, the increase in perspective and magnification between step 100 and step 106 may be substantial in order to achieve the desired increase in magnification, such that objects presented in step 100 may be substantially reoriented as displayed in step 106. However, the second magnification and second perspective utilized in step 104 desirably reduce user confusion by providing an intermediate map display to allow the user to gradually view the changes in perspective and magnification.

Step 106 may be performed automatically by the device 10 in response to step 104, such that the device may automatically perform step 106 regardless of user input or the user may provide a single magnification request to trigger both steps 104 and 106. Further, in embodiments where a plurality of magnification requests are provided, step 104 may be performed in response to a first magnification request and step 106 may be performed in response to a second magnification request such that each time the user functions the user interface 18 a magnification request is provided to increase magnification and corresponding perspective.

In step 108, the map is displayed utilizing additional perspectives and additional magnifications. As shown in FIG. 3, the additional perspectives and additional magnifications are greater than the third perspective and third magnification such that the progression from step 106 to step 108 causes an increase in perspective and an increase in magnification. Step 108 is generally similar to step 106 in that the displayed map or maps of step 108 may generally comprise a zoomed and rotated display of the map presented in step 106.

The additional perspectives and additional magnifications may comprise a plurality of additional perspectives and a plurality of additional magnifications such that step 108 may be repeated indefinitely to continually increase both magnification and perspectives until the displayed map is satisfactory to the device 10 or the user.

Additionally, in a similar manner to steps 104 and 106, the device 10, regardless of user input, may automatically perform step 108 or the user may provide a single magnification request to trigger both steps 104, 106, and 108. Further, in embodiments where a plurality of magnification requests are provided, step 104 may be performed in response to a first magnification request, step 106 may be performed in response to a second magnification request, and step 108 may be repeatedly performed in response to additional magnification requests such that each time the user functions the user interface 18 a magnification request is provided to increase magnification and corresponding perspective.

Further, the additional magnifications and perspectives provided by step 108 are each preferably gradual in comparison to the previously utilized magnification and perspective, as explained above, to prevent user confusion due to radical changes in displayed object locations. Thus, the progression of steps 100, 104, 106, and/or 108 may in combination provide a substantial increase in magnification and perspective, such that originally displayed objects are substantially reoriented or otherwise rearranged, but without user confusion due to the smooth transition provided by the display of gradually increasing magnifications and perspectives.

Also, as will be appreciated, the device 10 may increase magnification and perspective utilizing any combination of magnifications and perspectives, and need not be limited to the sequential combination of first, second, third, and additional magnifications and perspectives specifically described above.

In step 110, the demagnification request is received and at least one of the above steps may be repeated. Step 110 is generally similar to step 102 with the exception that the request is for demagnification and not magnification. Thus, the processor 12, through the user interface 18 including the display 20 and/or memory 16, may receive the demagnification request. For example, the user may provide the demagnification request by functioning an input, such as a button or switch, included with the user interface 20, providing data through the user interface 12 utilizing the memory 16 and/or additional devices, by touching or pointing at the display 20, by issuing a voice command, etc.

Additionally, the demagnification request may comprise a single request or the demagnification request may comprise a plurality of demagnification requests, such as a request by the user to decrease magnification by some multiple. For example, the user may function the user interface 18 more than once to repeatedly decrease magnification.

In response to the demagnification request, or automatically as determined by the processor 12, the device 10 may repeat one or more of the above steps, such as steps (e), (d), (c), and (a) to gradually decrease magnification and decrease perspective, thereby performing the generally opposite function described above. Such gradual decreases in magnification and perspective are beneficial in a similar manner to the gradual increases in magnification and perspective as it reduces user confusion caused by dramatic and immediate changes in magnification and perspective.

The device 10 may display the map utilizing the third perspective and third magnification, then the second perspective and the second magnification, and then the first perspective and first magnification to decrease magnification and perspective without confusing the user. As will be appreciated, the device 10 may display the map utilizing any combination of decreasing magnifications and perspectives such that the device 10 need not necessarily utilize the precise ordering of third, second, and first magnification and perspective.

Further, as explained above, steps 100-110 may be performed in any order. For example, the user may provide the magnification request to trigger the map to be displayed with the second perspective and second magnification (step 104) and then provide the demagnification request (step 110) to trigger the map to be displayed with the first perspective and the first magnification to cause the map to zoom-in and then zoom-out accordingly. Thus, the device 10 may create innumerable combinations of perspective and magnification such that the present invention is not limited to the specific ordering discussed herein.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A device comprising:
   a processor operable to acquire data corresponding to a map; and
   a display coupled with the processor, the processor and display operable to—
      display the map with a first magnification and a first perspective, and in response to a magnification request—
         display the map with a second magnification and a second perspective, the second magnification and the second perspective being greater than the first magnification and the first perspective, and
         display the map with a third magnification and a third perspective, the third magnification and the third perspective being greater than the second magnification and the second perspective.

2. The device of claim 1, further including a user interface operable to provide the magnification request to the processor.

3. The device of claim 1, wherein the processor is operable to automatically generate the magnification request in response to a navigation event.

4. The device of claim 3, wherein the navigation event corresponds to a geographic location.

5. The device of claim 4, wherein the navigation event corresponds to a stored geographic location.

6. The device of claim 3, wherein the navigation event corresponds to a geographic area.

7. The device of claim 3, wherein the navigation event corresponds to a turn that the device is approaching.

8. The device of claim 1, wherein in response to the magnification request, the display is operable to display the map with a plurality of additional magnifications and a plurality of additional perspectives greater than the third magnification and the third perspective.

9. The device of claim 1, wherein the processor is further operable to receive a demagnification request and, in response to the demagnification request, the display is operable to sequentially display the map with at least two of the third magnification and third perspective, the second magnification and the second perspective, and the first magnification and the first perspective.

10. The device of claim 1, wherein the first magnification and first perspective present a generally overhead view and the third magnification and the third perspective present a generally perspective view.

11. The device of claim 1, wherein the device is a navigation device.

12. The device of claim 11, further including a location determining component to facilitate determining a current geographic location of the device.

13. The device of claim 12, wherein the displayed map includes the current geographic location of the device.

14. The device of claim 1, wherein the magnification request includes a plurality of magnification requests, and a first magnification request causes the map to be displayed with the second magnification and the second perspective and a second magnification request causes the map to be displayed with the third magnification and the third perspective.

15. The device of claim 1, wherein, in response to the magnification request, the first magnification and the first perspective are concurrently increased to display the map with the second magnification and the second perspective.

16. A navigation device comprising:
   a processor operable to—
      acquire data corresponding to a map including a current geographic location of the device, and
      receive at least one magnification request;
   a location determining component coupled with the processor and operable to facilitate determination of the current geographic location of the device;
   a user interface coupled with the processor and operable to receive the at least one magnification request from a user; and
   a display coupled with the processor, the processor and display operable to—
      display the map with a first magnification and a first perspective,
      in response to a first magnification request—
         display the map with a second magnification and a second perspective, the second magnification and the second perspective being greater than the first magnification and the first perspective, and
      in response to a second magnification request—
         display the map with a third magnification and a third perspective, the third magnification and the third perspective being greater than the second magnification and the second perspective.

17. The device of claim 16, wherein in response to at least a third magnification request, the display is operable to display the map with a plurality of additional magnifications and a plurality of additional perspectives greater than the third magnification and the third perspective.

18. The device of claim 16, wherein the first magnification and first perspective present a generally overhead view and the third magnification and the third perspective present a generally perspective view.

19. The device of claim 16, wherein the display and the user interface are integral.

20. The device of claim 16, further including a memory coupled with the processor to enable the processor to access the memory to acquire the data corresponding to the map.

21. The device of claim 16, further including a housing for housing the processor, the location determining component, the user interface, and the display.

22. The device of claim 16, wherein the processor is further operable to receive a demagnification request and, in response to the demagnification request, the display is operable to sequentially display the map with at least two of the third magnification and third perspective, the second magnification and the second perspective, and the first magnification and the first perspective.

23. The device of claim 16, wherein, in response to the first magnification request, the first magnification and the first perspective are concurrently increased to display the map with the second magnification and the second perspective.

24. A method of displaying a map, the method comprising the steps of:
  (a) displaying the map utilizing a first magnification and a first perspective;
  (b) receiving a magnification request;
  (c) in response to the magnification request, displaying the map with a second magnification and a second perspective, the second magnification and the second perspective being greater than the first magnification and the first perspective; and
  (d) in response to the magnification request, displaying the map with a third magnification and a third perspective, the third magnification and the third perspective being greater than the second magnification and the second perspective.

25. The method of claim 24, further including step (e)—displaying the map with a plurality of additional magnifications and a plurality of additional perspectives greater than the third magnification and the third perspective.

26. The method of claim 24, further including step (f)—receiving a demagnification request and sequentially repeating at least two of the steps (d), (c), and (a).

27. The method of claim 24, wherein steps (a), (c) and (d) include utilizing a navigation device to display the map.

28. The method of claim 24, wherein the map displayed in step (a) presents a generally overhead view and the map displayed in step (d) presents a generally perspective view.

29. The method of claim 24, wherein the map displayed in steps (a), (c), and (d) includes a current geographic location of the device.

30. The method of claim 24, wherein the magnification request includes a plurality of magnification requests, and step (c) includes displaying the map with the second magnification and the second perspective in response to a first magnification request and step (d) includes displaying the map with the third magnification and third perspective in response to a second magnification request.

31. The method of claim 24, wherein, in response to the magnification request, the first magnification and the first perspective are concurrently increased in step (c) to display the map with the second magnification and the second perspective.

* * * * *